US006131612A

United States Patent [19]
Beurskens

[11] Patent Number: 6,131,612
[45] Date of Patent: *Oct. 17, 2000

[54] VALVE FOR A SUPERHEATED-STEAM CONVERSION PLANT

[76] Inventor: Theo Beurskens, Bosbergstraat 58, NL-5943-AN Lomm, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/611,522

[22] Filed: Mar. 6, 1996

Related U.S. Application Data

[63] Continuation of application No. 08/342,082, Nov. 18, 1994, abandoned.

[51] Int. Cl.[7] ............................................. F16K 1/54

[52] U.S. Cl. ........................................ 137/625.39; 137/629

[58] Field of Search ....................... 137/629, 625.37, 137/625.38, 625.39, 625.48, 861, 862

[56] References Cited

U.S. PATENT DOCUMENTS

| | | | |
|---|---|---|---|
| 978,385 | 12/1910 | Soften | 137/629 |
| 2,355,458 | 8/1944 | Masterbrook | 137/625.38 X |
| 3,704,726 | 12/1972 | Lewis | 137/625.37 X |
| 3,964,516 | 6/1976 | Purton et al. | 137/625.38 |

FOREIGN PATENT DOCUMENTS

| | | |
|---|---|---|
| 19 01 909 B2 | 9/1969 | Germany . |
| 3126295 | 1/1983 | Germany . |
| 32 27 317 C2 | 2/1984 | Germany . |
| 35 25 141 A1 | 1/1987 | Germany . |
| 37 20 918 C1 | 11/1988 | Germany . |
| 38 35 363 A1 | 8/1989 | Germany . |
| 3942109 | 6/1991 | Germany . |
| 88 16 986 U1 | 9/1991 | Germany . |
| 196 35 464 A1 | 5/1997 | Germany . |
| 390945 | 4/1965 | Switzerland . |

OTHER PUBLICATIONS

Zikesh shop drawing, dated Oct. 4, 1988.

Bopp & Reuther GmbH shop drawing dated Apr. 3, 1991.

Welland & Tuxhorn product literature, 1989.

WPI English abstract of DE 196 35 464 A1, Beurskens, published May 22, 1997.

Drawing dated Sep. 18, 1992 and captioned "Anlage 5" [Attachment 5] and "Umbau Dampfumformventil Typ BN72 Mercedes Benz" [alteration of steam conversion valve type BN72].

Drawing captioned "Anlage 1" [Attachment 1], Bopp & Reuther # 3–38–18750.1 and "Dampfumformventil Typ BN72 mit E–Antrieb" [steam conversion valve type BN72 with E–drive].

Drawing captioned "Anlage 6" [Attachment 6], Bopp & Reuther # 3–38–18750.1 and "Dampfumformventil Typ BN72 mit E–Antrieb" [steam conversion valve type BN72 with E–drive].

*Primary Examiner*—John Fox
*Attorney, Agent, or Firm*—Milton Oliver; Ware, Fressola, Van Der Sluys & Adolphson LLP

[57] ABSTRACT

The invention relates to a valve, more particularly for a superheated steam conversion station, having an inlet and an outlet which can be closed by a closure member extending into the inlet or outlet, and a draw-off via which a component flow of the steam can be drawn off in the form of booster steam from the valve chamber (2) of the valve casing in dependence on the position of the closure member; the inlet or outlet is constructed with at least one chamber connected to a booster steam drawing-off bore with which a fixed wall of the chamber is formed; and when the valve is closed the chamber, which is sealed off from the pressure side of the valve by sealing faces of the closure member, is connected to said pressure side of the valve with the first lifting of the closure member, while the inlet or outlet is not yet opened or not yet completely opened.

11 Claims, 9 Drawing Sheets

VALVE FOR A SUPERHEATED-STEAM CONVERSION PLANT

This application is a file-wrapper continuation of now abandoned application Ser. No. 08/342,082 filed Nov. 18, 1994.

FIELD OF THE INVENTION

The present invention relates to a valve and more particularly to a valve for a superheated steam conversion station, having an inlet and an outlet which can be closed by a closure member extending into the inlet or outlet, and a draw-off via which a component flow of the steam can be drawn off in the form of booster steam from the valve chamber of the valve casing depending upon the position of the closure member. The booster steam flow drawn off with such valves can be used in the conversion of superheated steam for the eddying of water which is sprayed into the steam to reduce its temperature.

BACKGROUND OF THE INVENTION

A valve of the kind specified is known from German Patent Specification DE 32 27 317 C2. In that valve the valve outlet can be closed by a piston which, when the valve is closed, fits positively into the conical outlet, which it seals. The piston is formed with an axial blind bore, from which channels extend radially and discharge on the outside of the piston. The outlet openings of the channels are so arranged that the channels are sealed by the inside wall of the outlet when the valve is closed. The piston is borne by an axially movable hollow spindle whose bore is connected on one side to the blind bore of the piston and on its other side to a drawing-off pipe for the booster steam. As soon as the piston is raised for the opening of the valve, pressurized steam flows into the gap produced between the piston and the outlet wall. A component flow of the steam flows through the channels of the piston and the bore of the hollow spindle into the drawing-off pipe.

The advantage of the known valve is that no additional valve is required for drawing off the booster steam, which is always reliably available at the same time as the valve is opened. However, a disadvantage of this valve is that it involves high manufacturing costs. Moreover, it has been found during the practical use of this Valve that sealing problems arise in the drawing-off of the booster steam. Lastly, the known valve does not ensure that an adequate volumetric flow of booster steam is available in the zone of water injection when the valve is opened.

OBJECT OF THE INVENTION

It is an object of the invention to use simple means to provide an inexpensive valve whose manufacture is simplified and which has improved operational reliability, accompanied by improved functioning.

SUMMARY OF THE INVENTION

This problem is solved according to the invention by the features that the inlet or outlet is constructed with at least one chamber connected to a booster steam drawing-off bore with which a fixed wall of the chamber is formed; and when the valve is closed the chamber, which is sealed off from the pressure side of the valve by sealing faces of the closure member, is connected to said pressure side of the valve with the first lifting of the closure member, while the inlet or outlet is not yet opened or not yet completely opened.

In the valve according to the invention a chamber connected to the booster steam draw-off is formed in the zone of the outlet adjacent the valve chamber. As soon as the closure member is inserted in the valve inlet or outlet and the valve is closed, the chamber is also sealed off from the pressure side of the valve. As a result, both the main steam flow and also the booster steam flow are cut off simultaneously. When the closure member is raised to open the valve, the pressurized steam flows into the chamber, from which a component flow of the high-pressure steam flows in the form of booster steam via the drawing-off bore to the draw-off, while the greater proportion of the steam flows out of the valve via the outlet or into the valve via the inlet only when the closure member has been further lifted. The chamber is associated with the inlet or outlet in dependence on the direction of flow of the steam and the construction of the closure member.

As in the prior art, the valve according to the invention also requires no additional valves for drawing off the booster steam. The manufacturing and operational security of the valve according to the invention are simplified in comparison with the prior art by the feature that no moving parts are disposed in the drawing-off pipe.

In this way the means required for sealing the booster steam pipe can be reduced to a minimum. Since moreover the booster steam is immediately available at high pressure with the opening of the closure valve, while the main steam flow flows into or out of the valve with a displacement in time, the water sprayed into the steam after the opening of the valve is always reliably eddied by an adequate volumetric flow of booster steam. In this way the valve is reliably protected against overheating during the opening phase of the valve.

The valve is so constructed that at least one of the walls of the chamber can be displaced for the opening of forming chamber. This can readily be effected by the the walls of the chamber on the one hand by the inside wall of the inlet or outlet and on the other hand by the outside wall of the closure member. The manufacture of the valve according to the invention can also be further simplified by constructing the chamber so that at extends circularly. This is more particularly the case if two adjoining walls are formed by the inside wall of the inlet or outlet, while the other walls of the chamber are formed by the outside wall of the closure member.

The flow properties of the valve can be improved by the feature that the top wall of the chamber is concavely arcuate and formed by the outside wall of the closure member and, when the closure member is closed, bears tangentially against the outer side wall of the chamber. Such a construction of the chamber moreover enables the volumetric flow of steam emerging through the gap produced by the opening of the valve to rise in a given control ratio.

The closure member can take the form of a perforate cage cone or a parabolic cone. Sealing faces particularly simple to produce can be obtained if the closure member has a circularly extending extension on which a sealing face is formed which is applied to a sealing face enclosing the inlet or outlet when the valve is closed. The manufacture of the valve according to the invention can be further simplified by forming at least one of the walls of the inlet or outlet by an insert member inserted into the inlet or outlet. Conveniently the chamber is connected via connecting bores to a distribution chamber which encloses the insert member and is connected to the drawing-off pipe. This construction of the valve also produces a particularly uniform volumetric flow of booster steam.

The operational security of the valve can also be improved forming the side wall of the chamber formed by the outside wall of the closure member, so that it is lengthened beyond the lower wall of the chamber oppositely to the lifting direction of the closure member. As a result, the valve outlet is completely opened only after a given lifting distance whose amount is determined by the length of that portion of the chamber side wall which is lengthened beyond the lower wall of the chamber. During the lifting of the closure member in relation to the inlet or outlet the chamber remains substantially closed until the lower edge of the side wall has passed the lower wall of the chamber. During this time the chamber is filled with pressurized steam, which flows into the drawing-off pipe. This gives additional security that an adequate flow of booster steam is available in the zone of water injection with the complete opening of the valve in cases in which long drawing-off pipes are used.

Particularly favorable flow conditions are obtained if the outlet walls are enclosed by a venturi-like annular chamber which is connected to the chamber via the drawing-off bore. This feature of the invention has on the one hand the advantage that with a compact valve casing the length of the drawing-off bore can be reduced to a minimum and the valve casing must not be formed with bores which are expensive to produce. On the other hand, the flow of booster steam emerges at high velocity in the zone of the discharge gap of the venturi-like annular chamber, so that the uniform eddying of the water in the main steam flow is additionally improved. This applies more particularly if a water injecting device is disposed in the zone of the discharge gap of the annular chamber. Such a feature of the invention is particularly suitable for turbine bypass stations which discharge into a condenser, since the optimum atomization and mixing of the water with the main steam flow prevents erosion damage to the condenser. Moreover, with such a feature of the invention only a very small water surplus is required. At the same time, large quantities of water can be injected at a low temperature and a pressure which is only slightly higher than the pressure of the main steam flow leaving the valve.

Another feature of the invention, which also enables the water to be injected at low pressure is characterized in that the chamber has a plurality of discharge bores which are connected to the inlet or outlet and can be closed by a control piston borne by the closure member.

An additional advantage of such a valve is that the steam pressure can be quietly and simply reduced in a number of stages in the valve outlet. Conveniently the control piston has at least one through-bore via which booster steam flows to the drawing-off bores when the closure member is lifted. The result is a particularly compact control valve. At the same time in this way the main steam flow is reliably controlled over a wide control range with a volumetric flow of booster steam which is always adequate.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
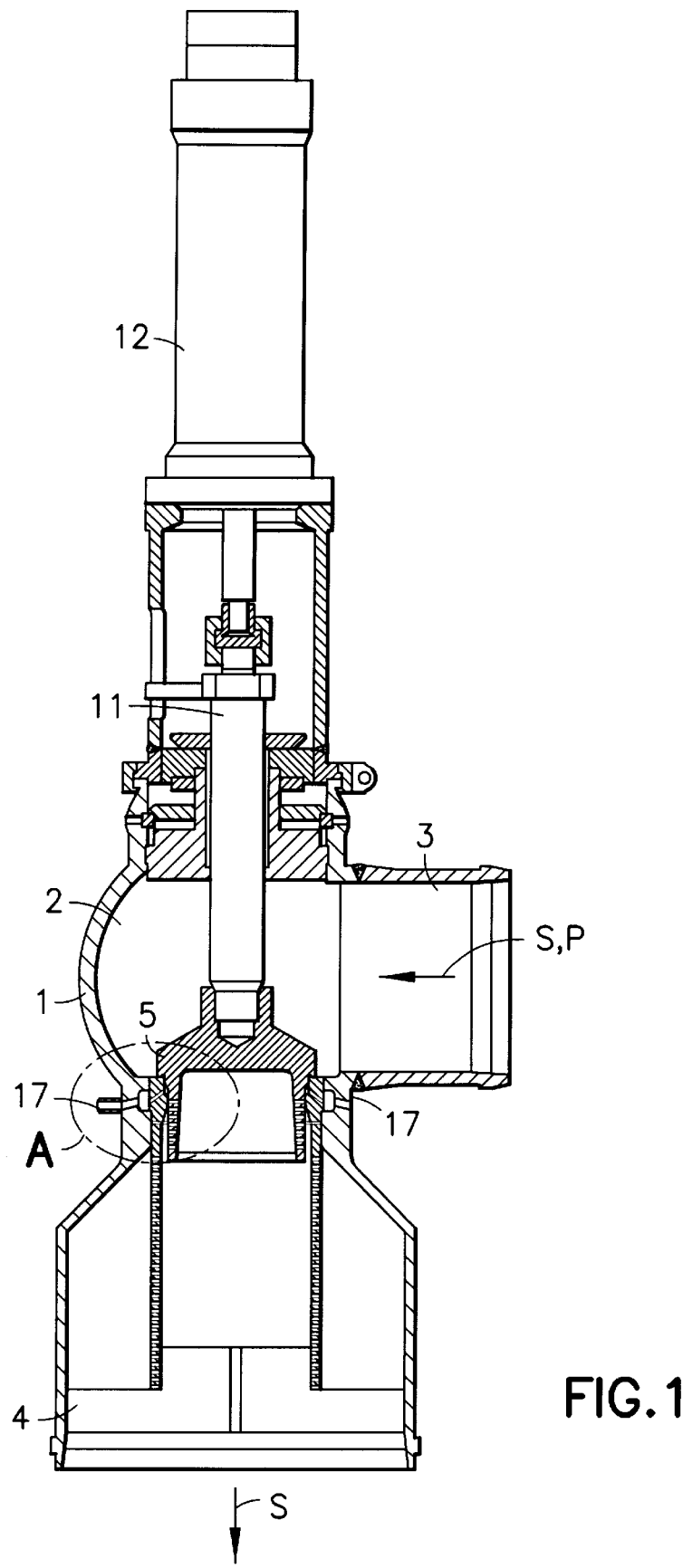
FIG. 1 shows a control valve in axial longitudinal section.

Each of the control valves shown in the drawings has a valve casing 1, a valve chamber 2 formed in the valve casing 1, an inlet 3 and an outlet 4, each of which can be closed by a closure member 5, 6, 7, 8, 9, 10. Each of the closure members 5–10 is attached to the tip of an axially displaceable piston rod 11 whose opposite end is connected to a device 12 for raising and lowering the closure member 5–10.

The closure member 5 inserted in the valve (FIGS. 1 and 2) takes the form of a perforate cone and has at its upper end adjacent the valve chamber 2 a circular extension (shoulder) 5a whose underside is formed with a circular ground sealing face 5b. With the closure member 5 lowered into the outlet 4, the sealing face 5b bears against a sealing face 13a of an insert member 13 circularly extending around the outlet opening of the valve chamber 2, thus sealing the valve chamber 2 off from the outlet 4.

The insert member 13 is inserted positively in the outlet 4 of the valve and retained by a weld 1a. Upper portion 13b of the insert member 13 associated with the valve chamber 2 is formed with a circular groove. Its walls form the outer side wall 14a and the lower wall 14b of a chamber 14. The inner side wall 14c and the upper wall 14d of the chamber 14 are formed by the outside wall 5c of the closure member 5. The upper wall 14d is convexly arcuate and bears tangentially closely against the outer side wall 14a of the chamber 14 when the closure member is lowered into the outlet 4. The upper wall 14d of the chamber merges into a groove 5d which is formed in the extension 5a of the closure member and whose outer edge adjoins the sealing face 5a. The inner side wall 14c is extended beyond edge 14b' of the lower wall 14b.

The chamber 14 is connected via drawing-off bores 15 let into the insert member 13 to an annular chamber 16 which is formed in the valve casing 1 and extends circularly around the insert member 13 and to which two diametrically opposite booster steam drawing-off pipes 17 are connected via further bores 16a.

With the closure member 5 lowered into the outlet 4 in a fully closed position, the valve chamber 2 is sealed off from the chamber 14 and the outlet 4. As soon as the closure member 5 is lifted into a partially closed position as shown in FIG. 2A, the steam present on the high-pressure side P of the valve in the valve chamber 2 flows through the gap produced between the sealing faces 5b and 13a into the chamber 14 at a low-pressure side of the sealing face or seat 13a. The lengthened inner side wall 14c of the chamber 14 ensures that the outlet 4 is opened after a travel corresponding to the length of that portion of the inner wall 14c which is extended beyond the lower wall 14b of the chamber. While this is going on booster steam flows via the drawing-off bore 15 into the annular chamber 16 and is there conducted to the drawing-off pipes 17. At the same time the increase of the volumetric flow of steam flowing into the chamber 14 is regulated by the shaping of the arcuate upper wall 14d of the chamber 14. This ensures that an adequate quantity of booster steam is available for eddying the water sprayed into the steam flowing from the outlet when the latter starts to open.

Figure 2:
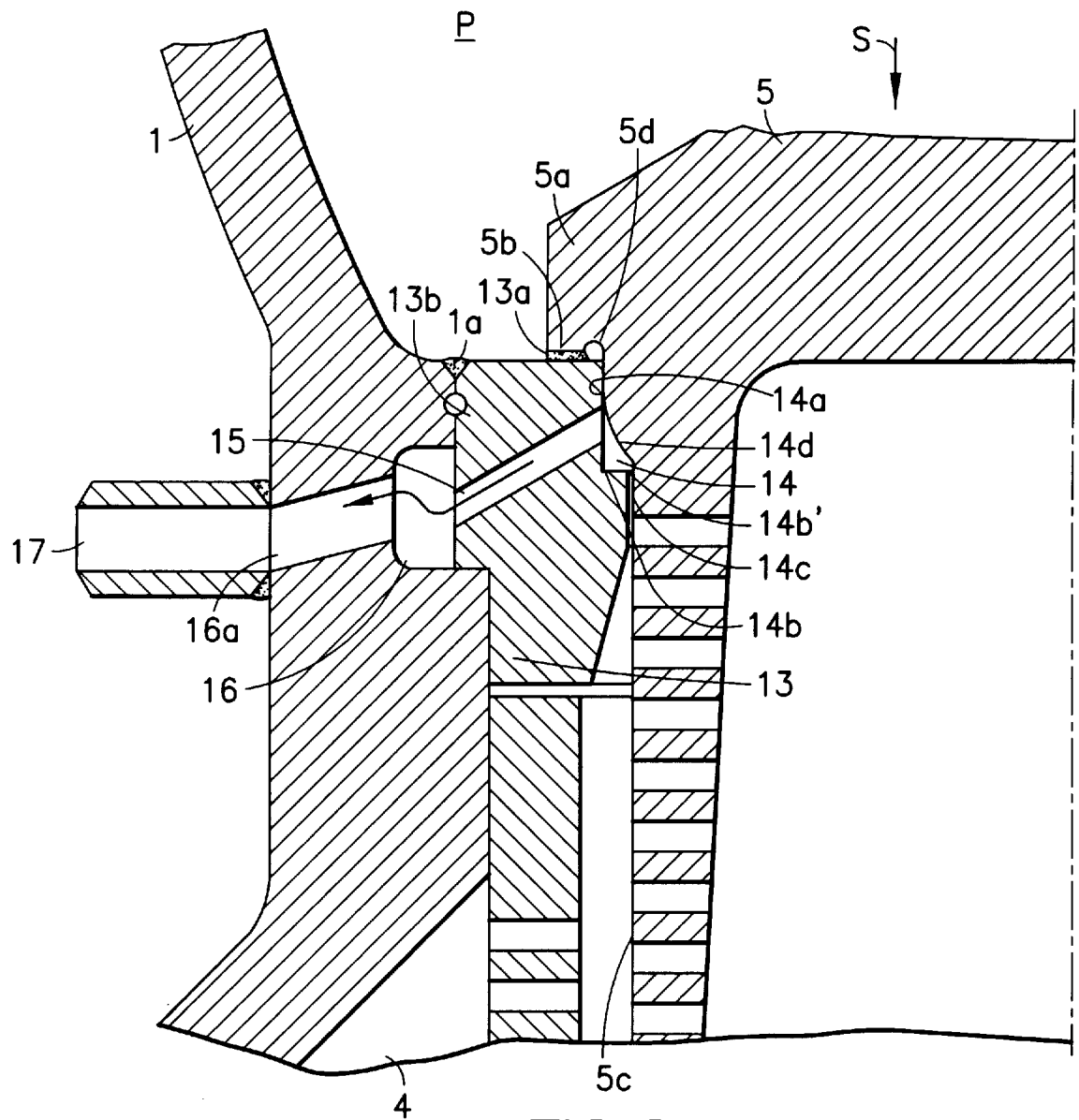
FIG. 2 is an enlarged detail A of a first embodiment of the control valve shown in FIG. 1.
Figure 2A:
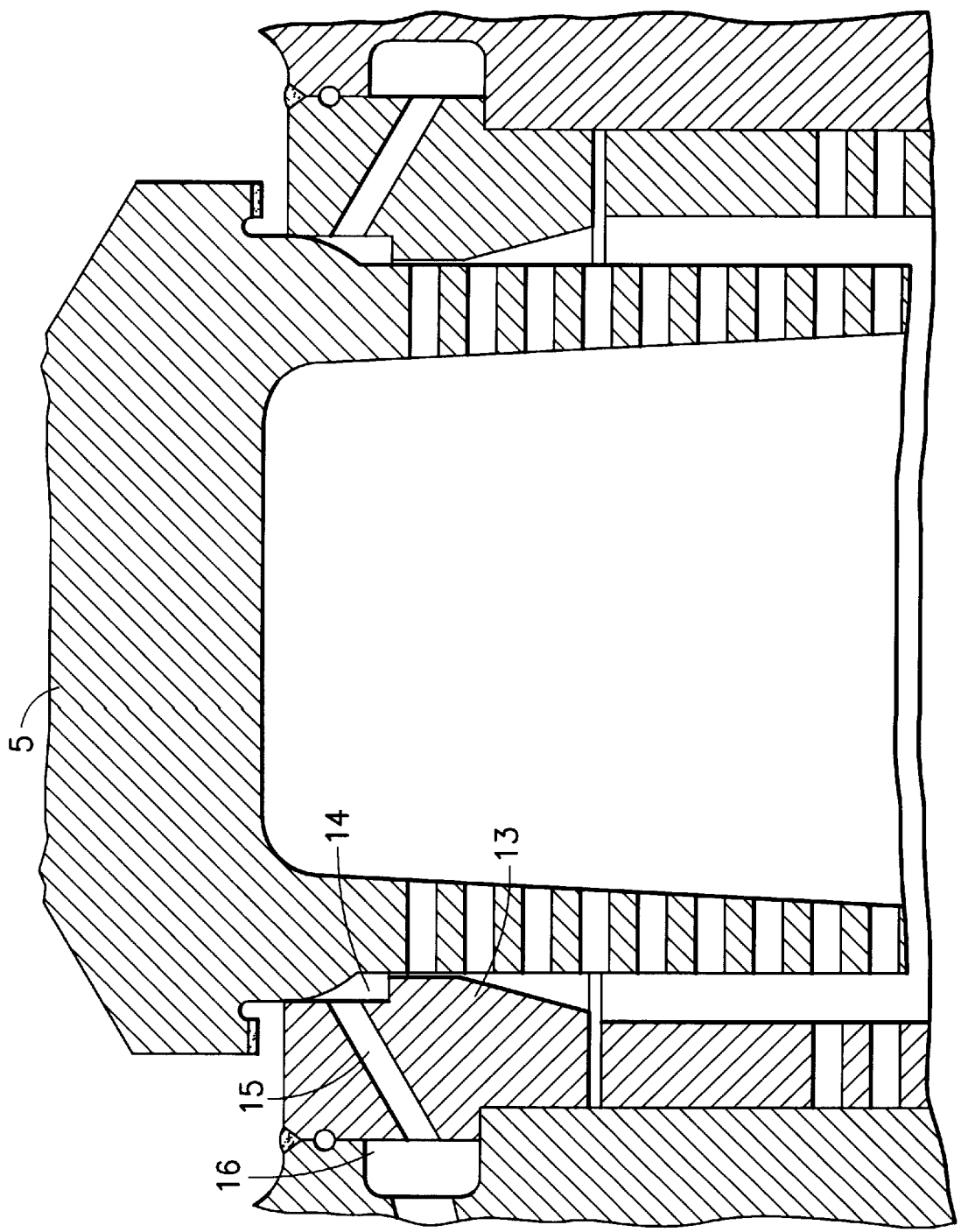
FIG. 2A is an enlarged detail showing the valve of FIG. 2 lifted.
Figure 3:
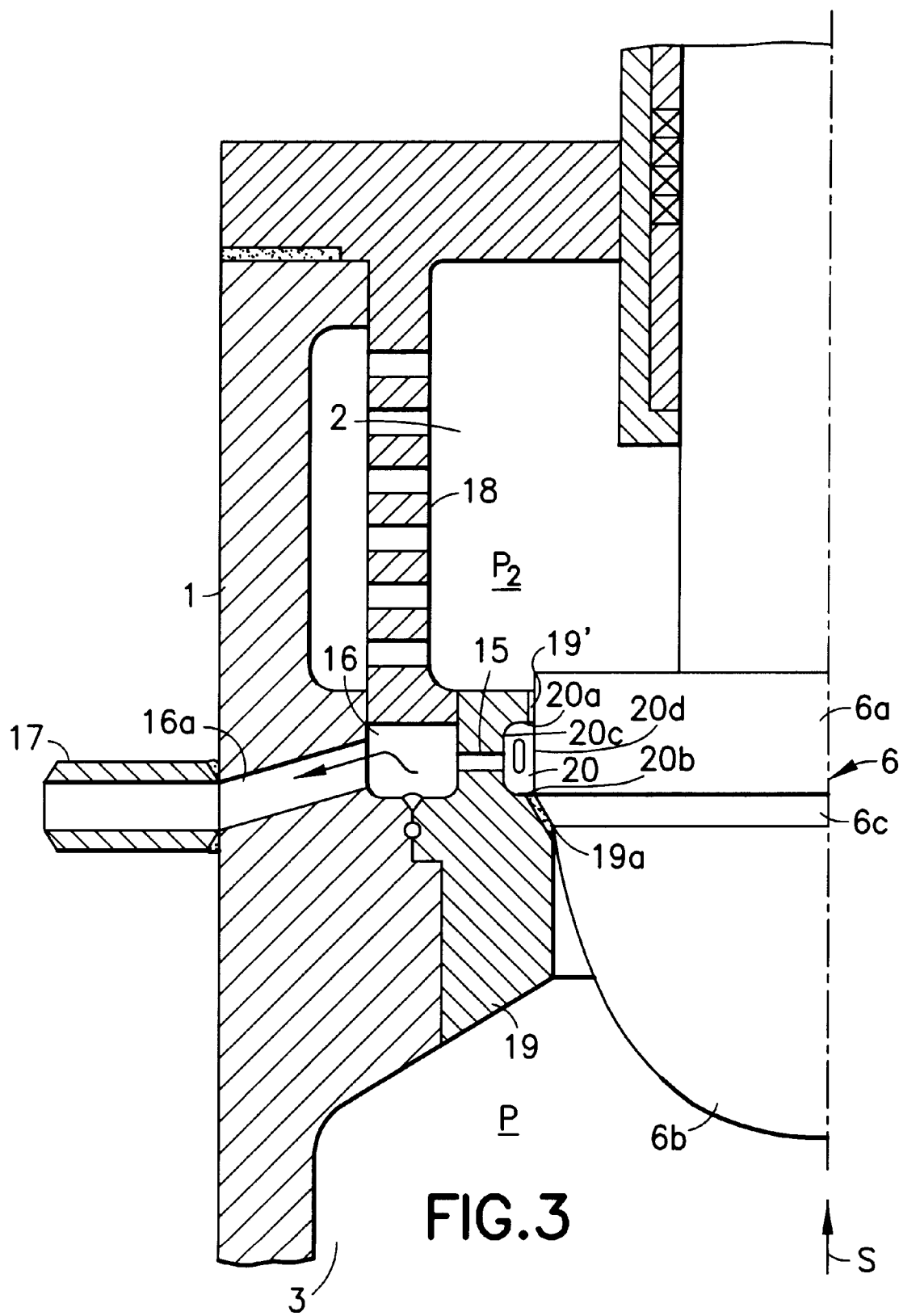
FIG. 3 is an enlarged detail of an alternative embodiment of a control valve with direction of flow reversed as against the valve shown in FIG. 1.

In the case of the control valve shown in FIG. 3 the direction of flow S of the steam is opposite to the valve shown in FIGS. 1 and 2. The closure member 6 takes the form of a parabolic cone and has a cylindrical extension 6a associated with the valve chamber. A perforate sound absorbing element 18 is inserted in the valve chamber 2. A conically chamfered sealing face 6c is constructed between the extension 6a and the tip 6b of the closure member 6. With the closure member 6 lowered into the inlet 3, the sealing face 6c bears against a conical sealing face 19a of an insert member 19 inserted into the inlet 3. Formed downstream of the sealing face 19a in the direction of flow S of the steam is an annular groove whose walls form the upper, lower and outer side walls 20a, b, c of a chamber 20. The inner side wall 20d of the chamber 20 is formed by the outside wall of the extension 6a.

As in the case of the valve shown in FIG. 2, after the lifting of the closure member 6 at first only the chamber 20 is filled with high-pressure steam. Similarly to the embodiment illustrated in FIG. 2, the steam is removed via drawing-off bores 15, an annular chamber 16, and from there via bores 16a and a drawing-off pipe 17. The main steam flow enters the valve chamber 2 only after the sealing face 6a has passed edge 19' of the insert member 19.

Figure 4:
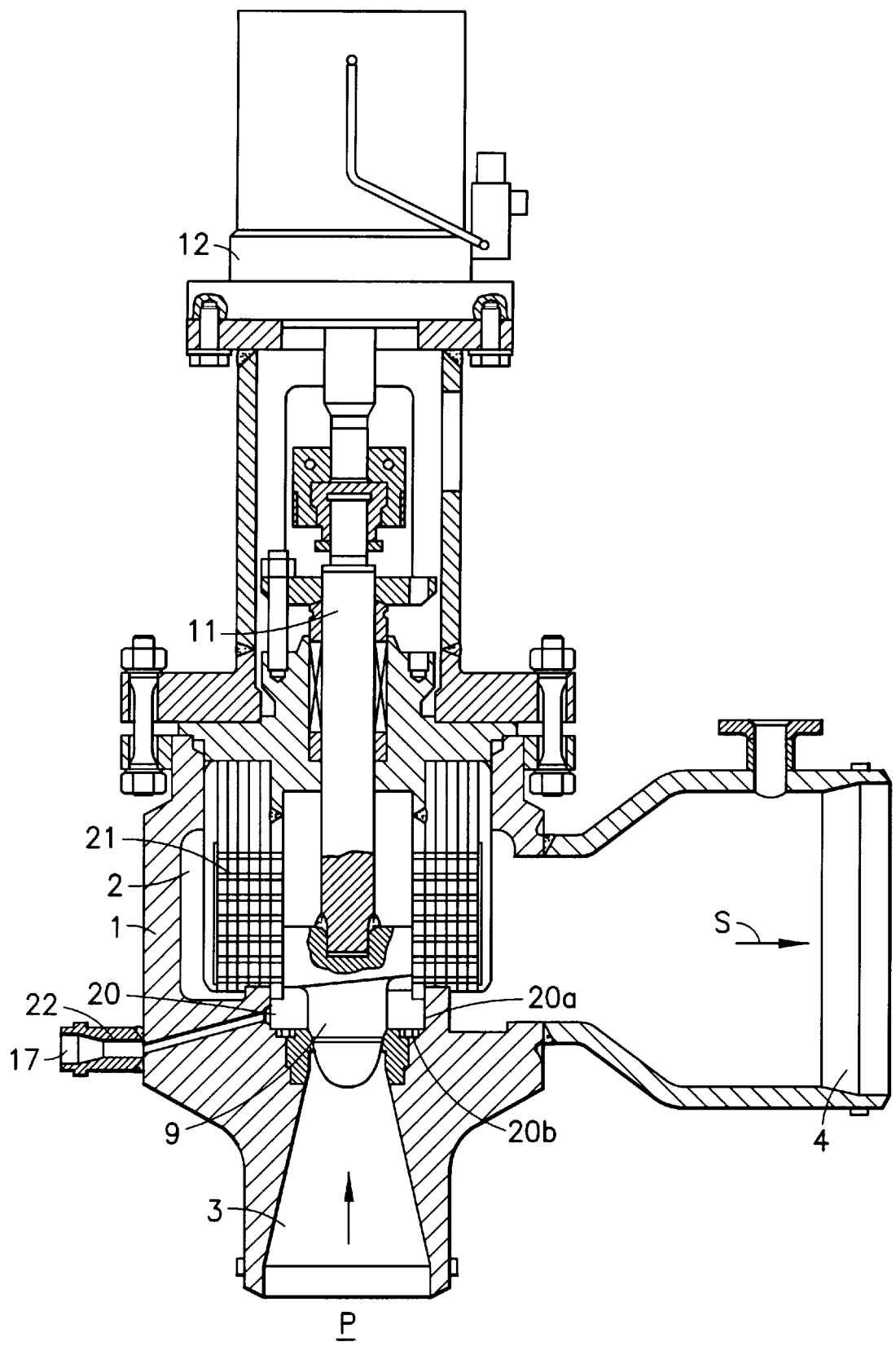
FIG. 4 shows an alternative embodiment of a steam control valve in axial longitudinal section.

FIG. 4 shows a valve essentially corresponding to the valve shown in FIG. 3. However, unlike the valve shown in FIG. 3, in this valve the side wall 20a and the lower wall 20b of a chamber 20 are formed not by the wall of an insert member, but by the wall of the inlet 3 of the valve casing 1 itself. Moreover, connected to the inlet 3 is a sound absorbing element 21 which enables the steam to expand quietly. The chamber 20 is connected via a drawing-off bore 22 to the drawing-off pipe 17.

Figure 5:
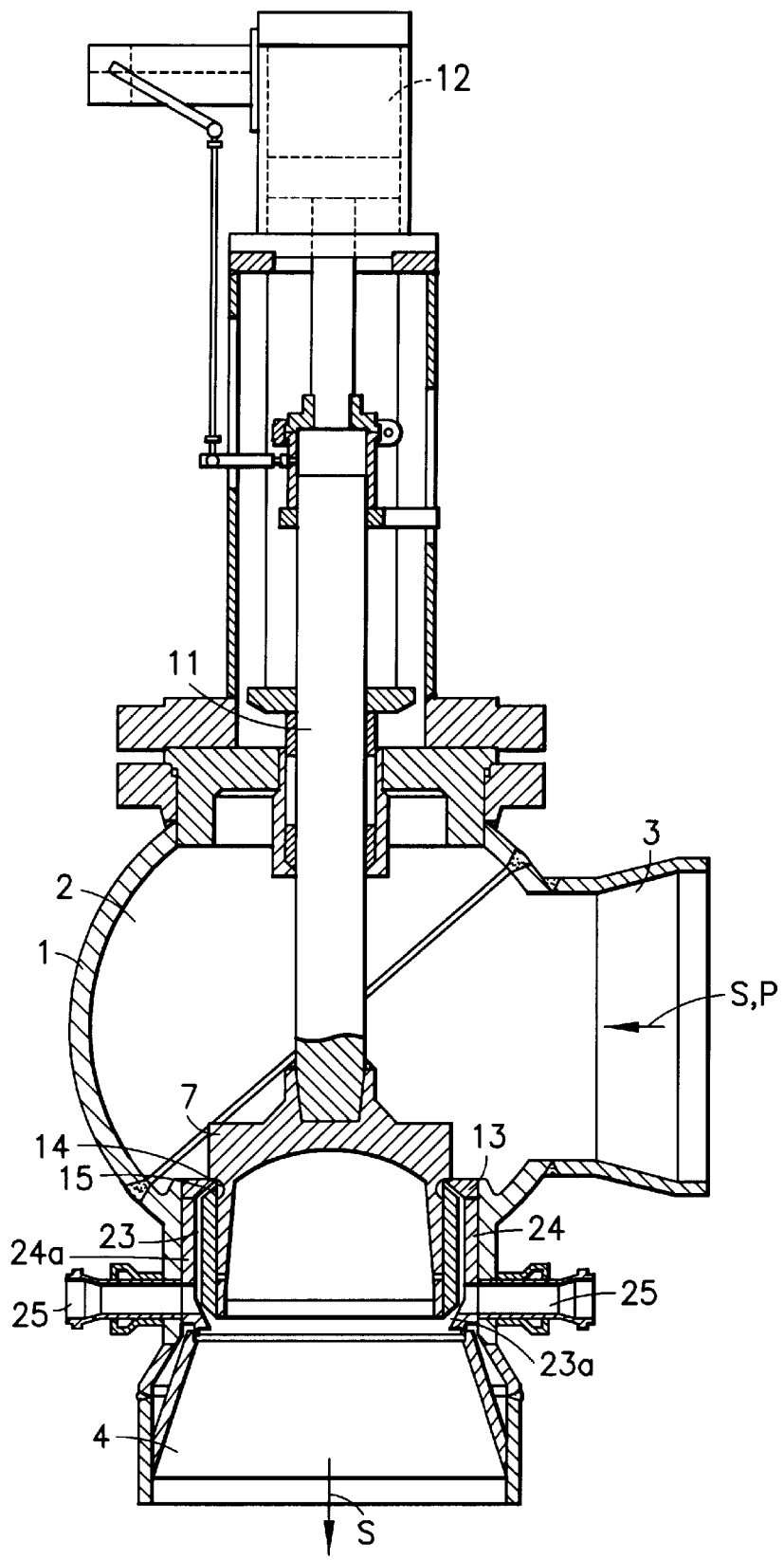
FIG. 5 shows a further embodiment of a steam control valve in axial longitudinal section.

In the embodiment illustrated in FIG. 5 the chamber 14 is constructed as in the embodiment shown in FIG. 2. However, the drawing-off bores 15 discharge into an annular chamber 23 which is formed between wall 24a of a second insert member 24 inserted into the outlet 4 of the valve and the wall of the insert member 13. The annular chamber 23 discharges in a gap 23a in the outlet 4. In this discharge zone the walls of the two insert members 13, 24 are constructed after the fashion of a venturi, so that the booster steam flowing at high velocity out of the annular chamber 23 entrains and distributes uniformly in the main steam flow the water which is injected via injection nozzles 25 inserted in the discharge zone of the annular chamber 23.

Figure 6:
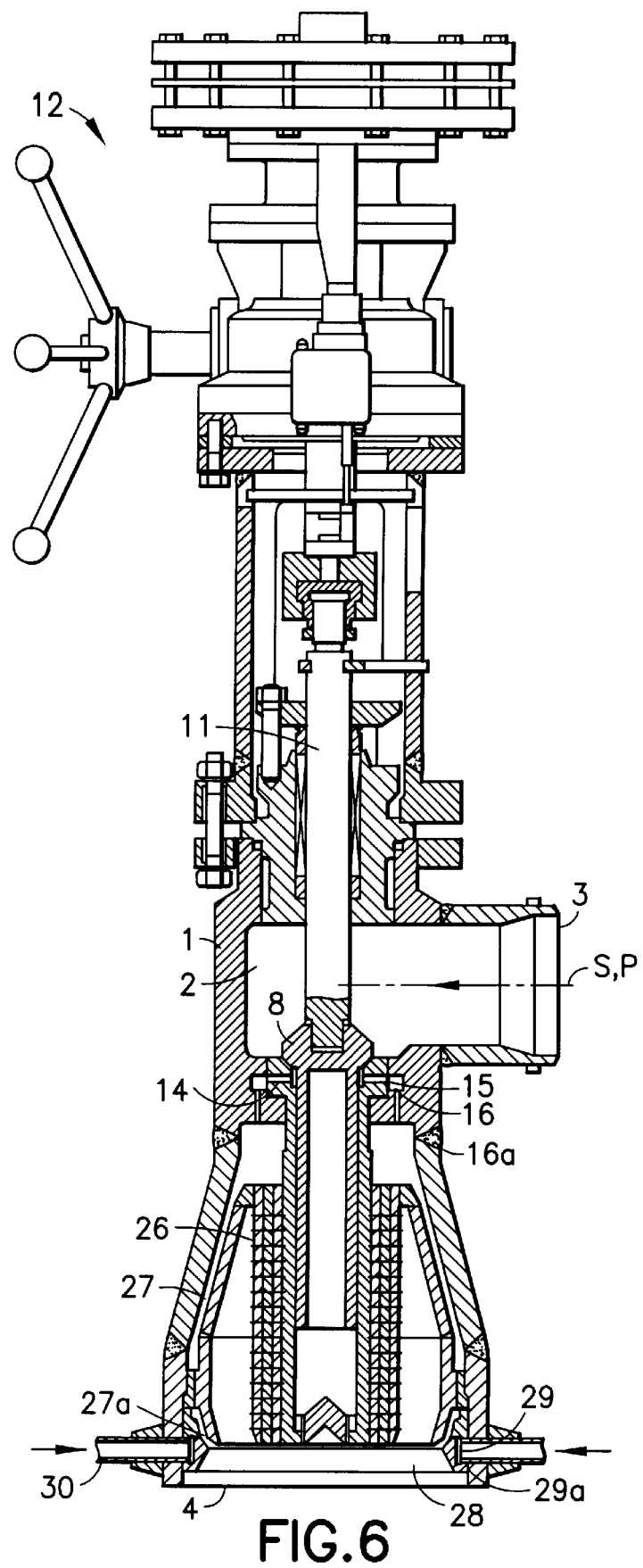
FIG. 6 shows a steam control valve with connected expansion stage in axial longitudinal section.

FIG. 6 shows a control valve which is similar in operation to the valve shown in FIG. 5. However, in addition to the valve shown in FIG. 5, this valve has a connected expansion stage 26. An annular chamber 27 is constructed after the fashion of a venturi between the outer walls 26a of the expansion stage and the walls of the outlet. Into the annular chamber 27 flows booster steam which, after the lifting of the closure member 8, is conducted into the chamber 14 and from there via the drawing-off bores 15, the annular chamber 16 and bores 28 into the annular chamber 27. Once again water is injected in the discharge zone 27a of the annular chamber 27. To this end disposed at that place is an insert member 29a which is formed with injection bores and which cooperates with the walls of the outlet 4 to form a further annular chamber 29 which is connected to pressurized water connections 30.

Figure 7:
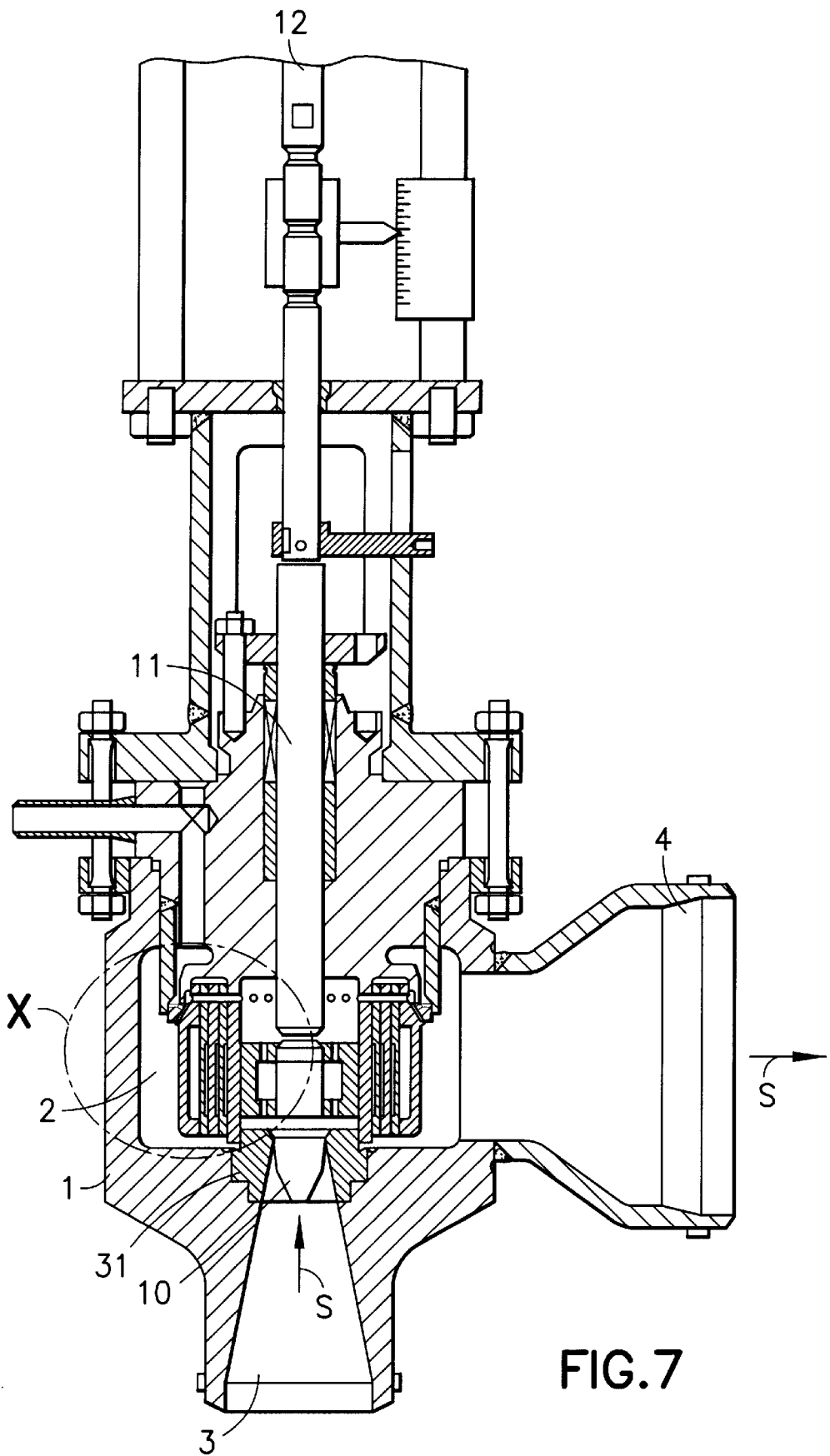
FIG. 7 shows a further embodiment of a steam control valve with connected expansion stage in axial longitudinal section.
Figure 8:
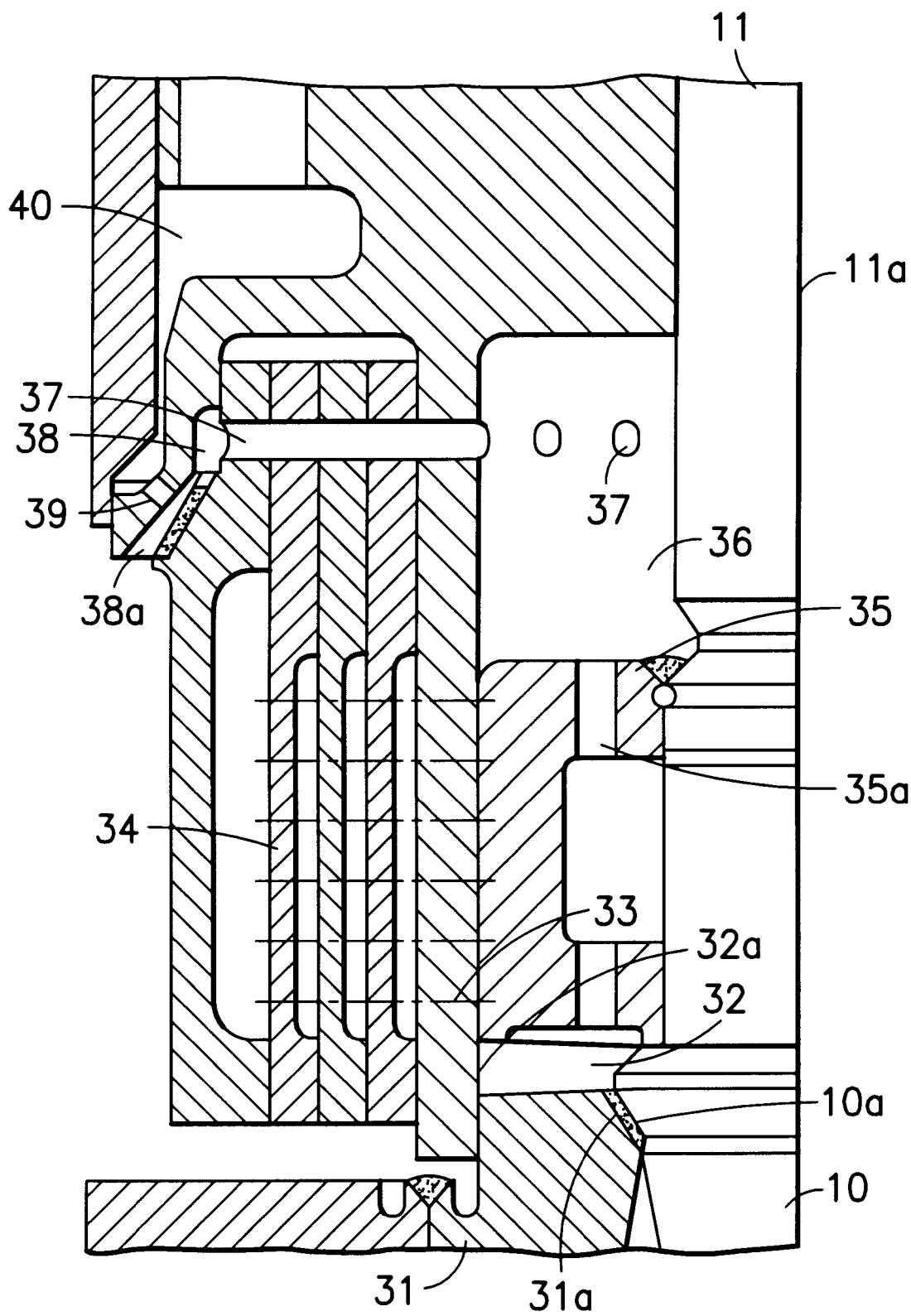
FIG. 8 an enlarged detail X of the steam control valve shown in FIG. 7.

The last embodiment, shown in FIGS. 7 and 8, is a valve used with low pressure side water injection at a conversion station. The steam pressure is reduced in a number of stages, with the advantage that the steam can be expanded quietly. In addition, the risk of a thermal shock and erosion by water particles is reduced in such conversion stations.

The valve has a parabolically conical closure member 10 similar to the closure member shown in FIG. 3. With the valve closed, the conical sealing face 10a of the this closure member bears against sealing face 31a of an insert member 31 inserted into the outlet. In the direction of flow S of the steam the insert member 31 is adjoined by a sound absorbing chamber 32, the central portion of whose wall 32a is formed with a plurality of bores 33 and which cooperates with sound absorbing elements 34 to form a sound absorber with the valve opened. In its upper portion, a chamber 36 is separated from the sound absorbing chamber 32 by a control piston 35 attached to the piston rod 11. The piston 35 opens up the bores 33 of the sound absorber 32 in dependence on the travel of the closure member 10. The piston 35 is also formed with through bores 35a which are disposed axis-parallel with the longitudinal axis 11a of the piston rod 11 and via which the chamber 34 is connected to the sound absorbing chamber 32. The chamber 34 is also connected via drawing-off bores 37 to an annular chamber 38 which is constructed after the fashion of a venturi and which discharges in the outlet 4 of the valve. Water which is supplied via pressure lines 40 formed in the valve casing 2 is sprayed in via spraying bores 39 in the discharge zone 38a of the annular chamber 38.

With the lifting of the closure member 10, steam penetrates into the sound absorbing chamber 32. Since at that time the bores 33 are still closed, the steam flows via the through bores 35a into the annular chamber 38, where as booster steam it entrains the injected water. By the further raising of the closure member 10, the control piston 35 opens up in steps the bores 33 for the main steam flow, until the valve is completely opened.

In the drawings: P=pressure side of the valve; S=direction of flow of steam.

What is claimed is:

1. A steam valve for a superheated steam conversion station, the steam valve comprising:

a casing formed with
   a port having a high-pressure side and a low-pressure side and formed therebetween with an annular valve seat,
   an annular draw-off chamber adjacent the valve seat and opening radially inward into the port immediately adjacent the seat on the low-pressure side, and
a draw-off passage extending from the draw-off chamber and opening into the low-pressure side downstream from the draw-off chamber;
a closure member displaceable in the casing between
   a fully closed position directly engaging the valve seat, blocking flow past the seat and through the port, and substantially closing the draw-off chamber,
   a partially closed position out of engagement with the valve seat, partially blocking the port and thereby permitting only restricted partial flow past the seat and through the port, and unblocking the draw-off chamber for restricted partial flow between the high-pressure side of the port and the draw-off chamber, and a fully open position out of engagement with the valve seat and completely unblocking the port for free flow past the seat and through the port; and means on the casing for moving the closure member between its positions.

2. The steam valve defined in claim 1, further comprising means for injecting water into the port at an outlet end of the draw-off passage.

3. The steam valve defined in claim 1 wherein the draw-off passage is formed around the port as a venturi-like annular chamber and forms a discharge gap opening into the downstream side downstream from the draw-off chamber.

4. The steam valve defined in claim 1 wherein the draw-off chamber is defined by an inside wall of the port and an outside wall of the closure member.

5. The steam valve defined in claim 1 wherein the draw-off chamber is circularly annular.

6. The steam valve defined in claim 1 wherein the casing has two adjoining inside walls forming an outside wall of the draw-off chamber while the closure member has an outside wall forming an inside wall of the draw-off chamber.

7. The steam valve defined in claim 1 wherein the closure member has a circularly extending extension on which a sealing face is formed which is applied to the seat in the fully closed position of the member.

8. The steam valve defined in claim 1 wherein the closure member is a perforate cage cone.

9. The steam valve defined in claim 1 wherein the closure member is a parabolic cone.

10. The steam valve defined in claim 1 wherein the draw-off chamber has a side wall formed by an outside wall of the closure member and lengthened beyond a lower wall of the draw-off chamber opposite to a lifting direction of the closure member.

11. The steam valve defined in claim 1 wherein the member is a perforated elongated body having an annular shoulder engageable with the seat.

* * * * *

UNITED STATES PATENT AND TRADEMARK OFFICE
CERTIFICATE OF CORRECTION

PATENT NO. : 6,131,612
DATED : October 17, 2000
INVENTOR(S) : Beurskens

It is certified that error appears in the above-identified patent and that said Letters Patent is hereby corrected as shown below:

<u>Column 1,</u>
Line 45, "Valve" should be -- valve --

<u>Column 2,</u>
Line 36, the second "the" should be deleted

<u>Column 3,</u>
Line 2, after "improved" -- by -- should be inserted.

<u>Column 4,</u>
Line 43, "Sa" should be -- 5a --

Signed and Sealed this

Sixth Day of November, 2001

Attest:

*Nicholas P. Godici*

*Attesting Officer*

NICHOLAS P. GODICI
*Acting Director of the United States Patent and Trademark Office*